INVENTOR.
HAROLD MOREINES
BY Charles J. Worth
AGENT

April 7, 1964 H. MOREINES 3,128,434

TRANSFLUXOR WITH AMPLITUDE MODULATED DRIVING PULSE INPUT CONVERTED TO ALTERNATING SINE WAVE OUTPUT

Filed April 28, 1960 4 Sheets-Sheet 2

INVENTOR.
HAROLD MOREINES
BY Charles J. Worth
AGENT

INVENTOR.
HAROLD MOREINES
BY Charles J. Worth
AGENT

INVENTOR.
HAROLD MOREINES
BY Charles J. Worth
AGENT

United States Patent Office 3,128,434
Patented Apr. 7, 1964

3,128,434

TRANSFLUXOR WITH AMPLITUDE MODULATED DRIVING PULSE INPUT CONVERTED TO ALTERNATING SINE WAVE OUTPUT

Harold Moreines, Springfield, N.J., assignor to The Bendix Corporation, a corporation of Delaware Filed Apr. 28, 1960, Ser. No. 25,455
9 Claims. (Cl. 328—27)

This invention relates to transfluxor circuits and more particularly to a transfluxor circuit having means for providing a sine wave output corresponding to an input signal.

Transfluxors are included to provide memory in various devices such as synchronizers, integrators, and low and high pass filters, which are required to provide precise, non-distorted signals. When a transfluxor is energized by sine wave reference signals, because of inherent characteristics, the signals at the output of the transfluxor are distorted and do not correspond in waveform to the energizing signals. To obtain non-distorted sine wave output signals from transfluxors, it has been necessary in the past to modulate the signals from the transfluxors but the signals drift in phase and cause an undesirable delay between the input and the output signals.

An object of this invention is to provide an undistorted sine wave output from a transfluxor circuit with inherent distortion characteristics without modulating the output.

Another object of this invention is to provide a transfluxor circuit which presents a data carrier waveform with negligible delay.

Another object of this invention is to provide a transfluxor circuit which presents undistorted phase reversible sine wave voltages.

This invention contemplates a transfluxor connected to a pulse source for alternately applying current driving pulses modulated by sine wave reference signals and current priming pulses of opposite polarity to the transfluxor. The transfluxor attenuates the input pulses in accordance with control signals applied to the transfluxor. The attenuated pulses are applied to means for clamping their lowest negative extremities to the zero axis to recover the maximum modulation amplitude. The clamped signals are then applied to an envelope detector for recovering the wave envelope corresponding to the pulse amplitudes. The recovered envelope is applied to a filter to obtain non-distorted attenuated alternating sine wave voltage.

The foregoing and other objects and advantages of the invention will appear more fully hereinafter from a consideration of the detailed description which follows, taken together with the accompanying drawings wherein two embodiments of the invention are illustrated by way of example. It is to be expressly understood, however, that the drawings are for illustration purposes only and are not to be construed as defining the limits of the invention.

Figure 1:
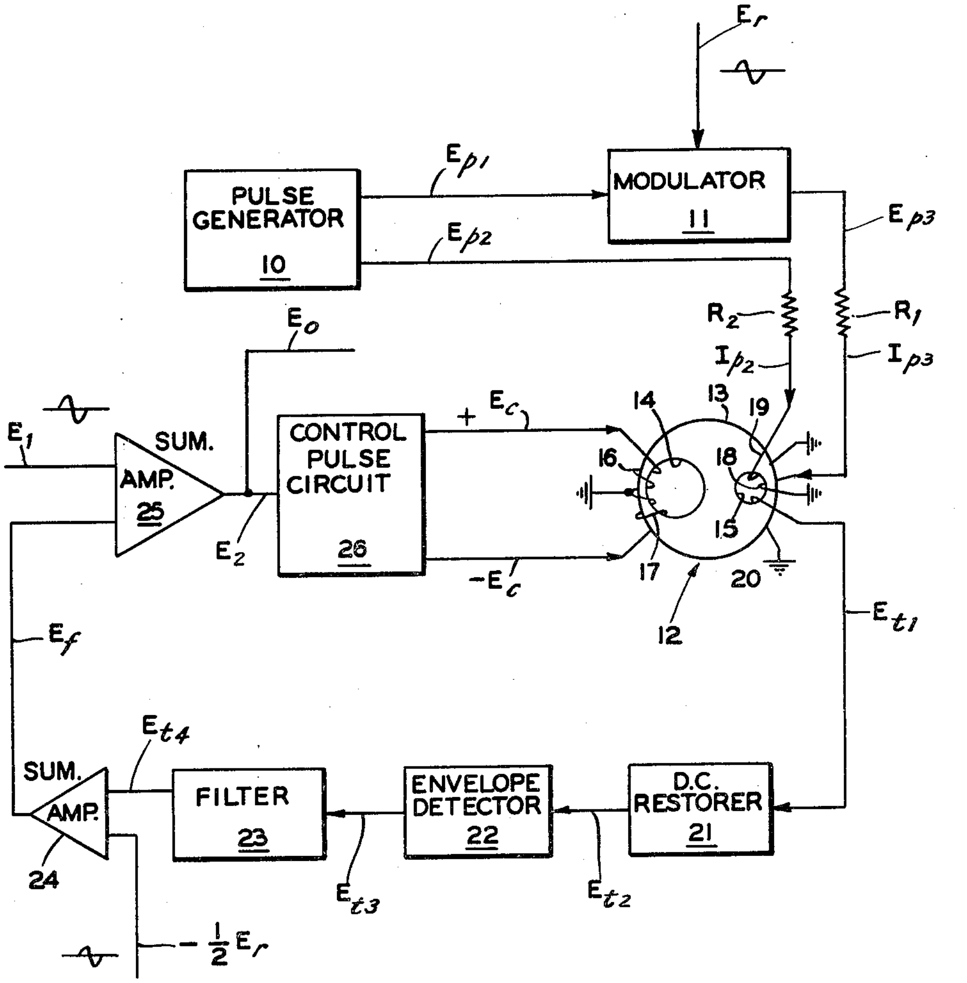
Figure 2:
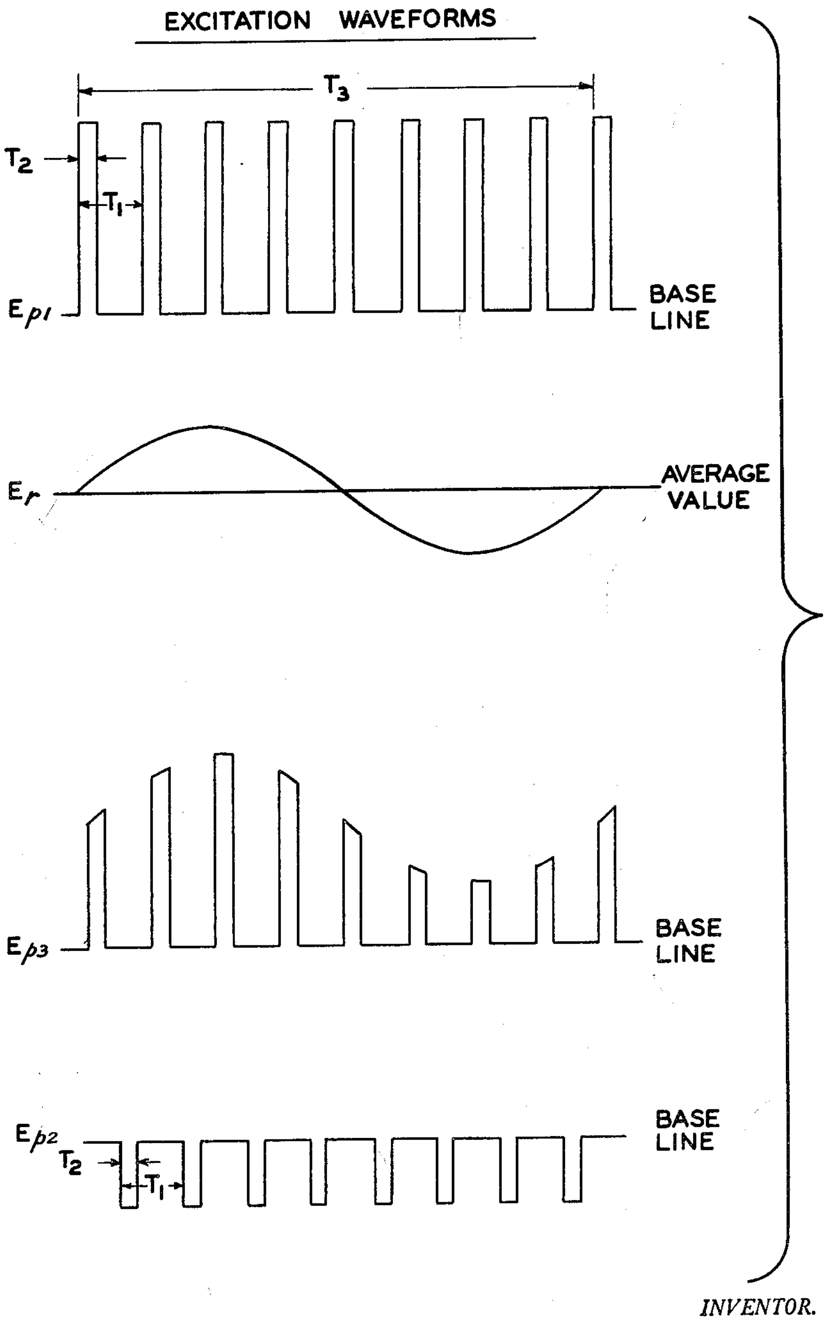
Figure 3:
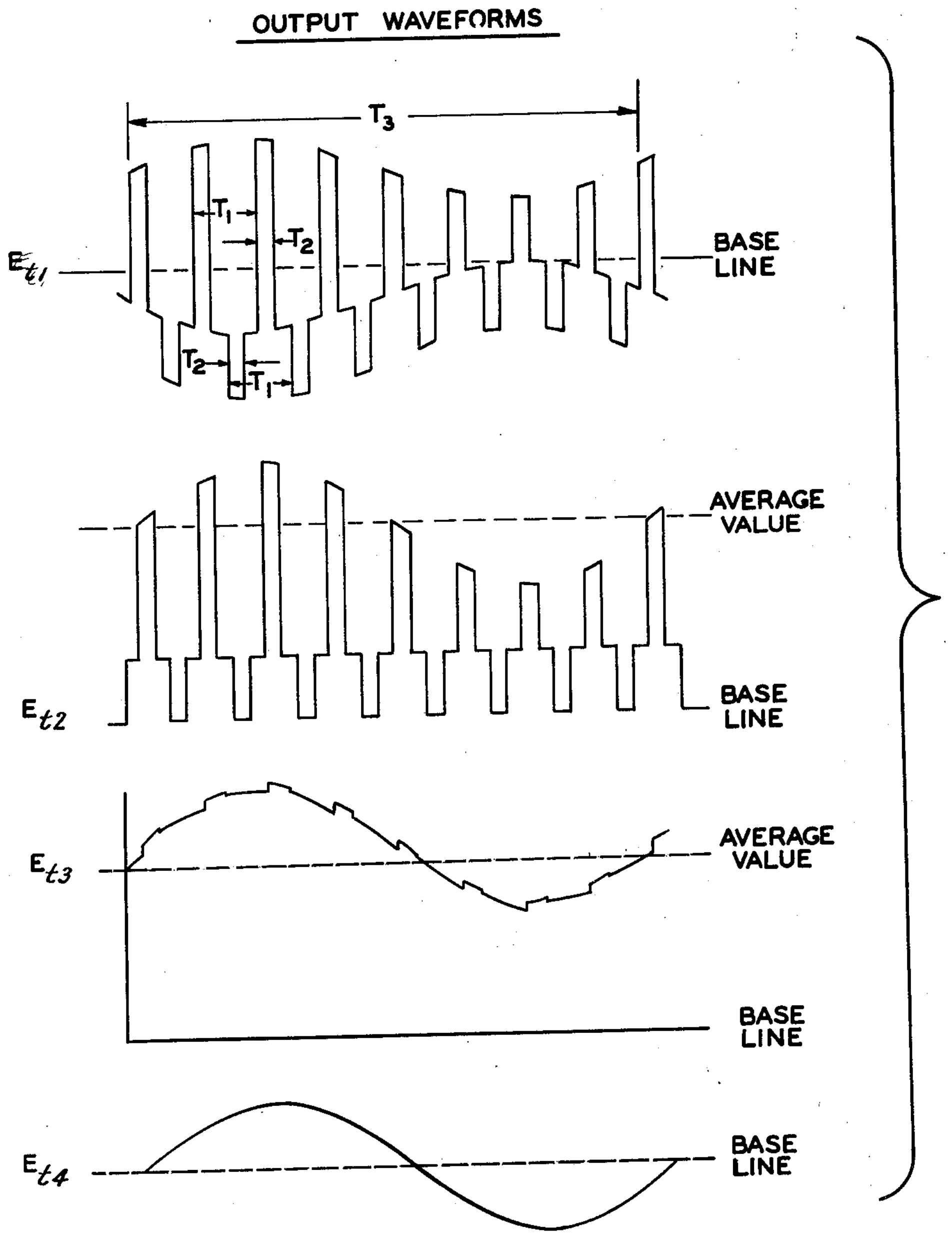
Figure 4:
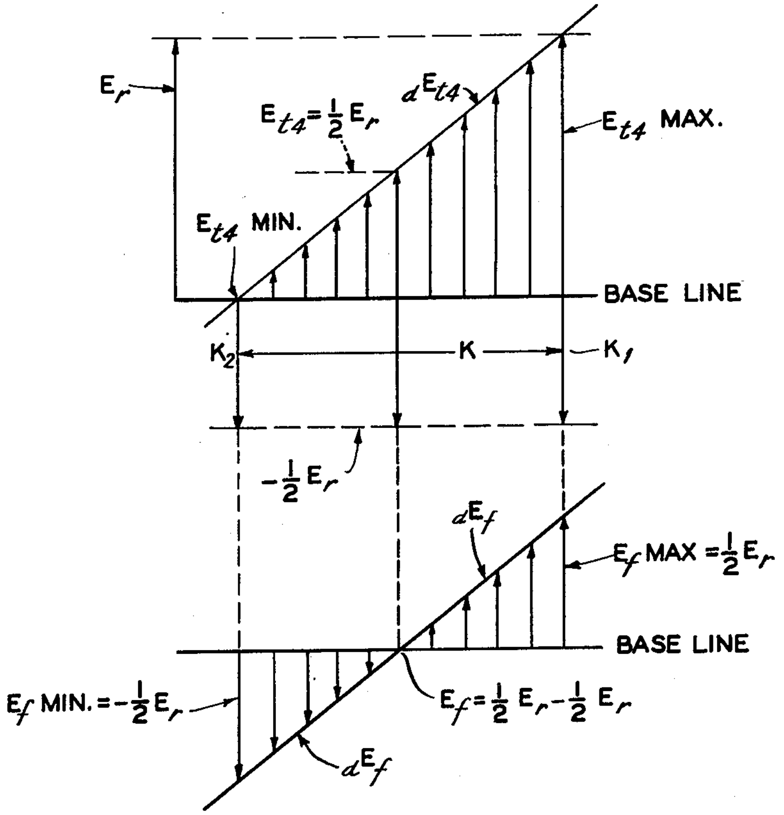
Figure 5:
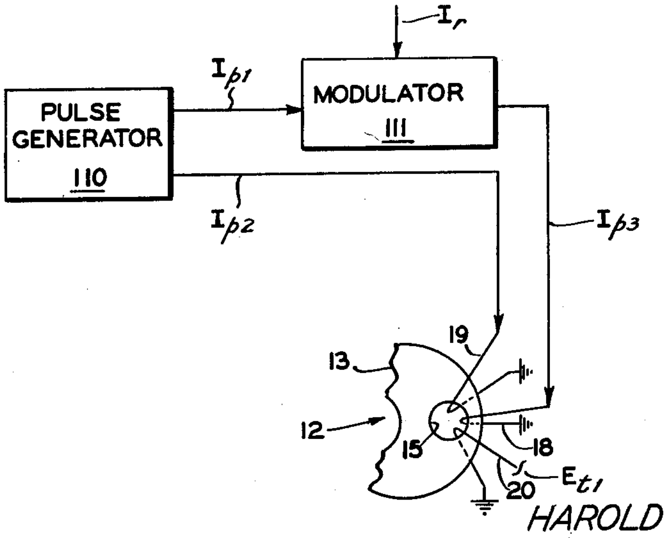

FIGURE 1 is a diagram of a novel transfluxor synchronizer circuit constructed according to the invention, FIGURE 2 illustrates representative transfluxor driving pulses and an associated pulse modulating waveform, FIGURE 3 illustrates various waveforms of the transfluxor output circuit of FIGURE 1, FIGURE 4 is a vector indication of the range of the transfluxor output signals and the amplitude and the phase of the corresponding feedback signals of FIGURE 1, and, FIGURE 5 is a diagram of modification of the transfluxor driving signal input portion of the circuit of FIGURE 1.

Referring now to FIGURES 1, 2 and 3 of the drawings, a pulse generator 10 alternately provides driving pulses $E_{p1}$ and priming pulses $E_{p2}$ which are voltage pulses of constant amplitude and opposite polarity. The driving pulses $E_{p1}$ are applied to a modulator 11 which receives constant amplitude, alternating sine wave reference voltage $E_r$. The alternating voltage $E_r$ modulates pulses $E_{p1}$ to produce amplitude modulated voltage driving pulses $E_{p3}$. The modulated pulses $E_{p3}$ are applied to a resistor $R_1$ to produce representative modulated current driving pulses $I_{p3}$ which are applied to a primary or energizing winding 18 of a transfluxor 12. The voltage pulses $E_{p2}$, produced by the pulse generator 10, are applied to a resistor $R_2$ to produce representative current priming pulses $I_{p2}$ which are applied to a second primary or energizing winding 19 of transfluxor 12.

The transfluxor 12 has a core 13 with two openings 14 and 15 therethrough. A pair of opposed windings 16 and 17 are associated with the opening 14 for applying control or setting pulse signals corresponding to voltage signals $E_1$ which may vary with a condition to vary the magnetization of the transfluxor core 13. The primary or energizing windings 18 and 19 are associated with the opening 15 and alternately apply the current driving pulses $I_{p3}$ and the priming pulses $I_{p2}$ to the core 13 to produce an alternating flux around the opening 15. The alternating flux excites a secondary or output winding 20, also associated with opening 15, to produce modulated voltage transfluxor output pulse signals $E_{t1}$. The transfluxor output signals $E_{t1}$ are attenuated by a factor K depending upon the past history of the amount of magnetization controlling the blocking or magnetization of the transfluxor 12 resulting from control pulse signals $+E_c$ and/or $-E_c$ applied to the core 13 by the windings 16 and/or 17. Since the transfluxor output signals $E_{t1}$ have no direct voltage component, the modulation envelope of the output signals $E_{t1}$ will be asymmetrically distributed with respect to the zero axis of the signal as illustrated in FIGURE 3. A suitable transfluxor is described in the March 1956 proceedings of the IRE, at pages 321 to 332, in an article by J. A. Rajchman entitled "The Transfluxor." To recover the maximum modulation amplitude of the output signals $E_{t1}$, the signals $E_{t1}$ are applied to a D.C. restorer 21 or other similar means for clamping the most negative extremities of the signals to the zero axis. The output signals $E_{t2}$ from the D.C. restorer 21 are applied to an envelope detector 22 to peak detect the pulses of the signals $E_{t2}$ and provide output signals $E_{t3}$ which are applied to a filter 23 to obtain undistorted alternating sine wave voltage signals $E_{t4}$.

The pulses $E_{p1}$ and $E_{p2}$ produced by the pulse generator 10 have a pulse frequency $T_1$ and a pulse width $T_2$. A sub-carrier period $T_3$ is equal to one cycle of the alternating voltage $E_r$ as may be seen in FIGURES 2 and 3. Although the pulse signals $E_{p1}$ and $E_{p2}$, the alternating reference voltage $E_r$ and the detected envelope $E_{t3}$ are not drawn to a true relative scale in FIGURES 2 and 3 of the drawings, the ratio of the pulse period $T_1$ to the sub-carrier period $T_3$ should be approximately 100 to 1 for efficient recovery of the modulation envelope $E_{t3}$ by the envelope detector 22. This ratio is included as one found to be acceptable for efficient operation and is not to be construed as defining a limitation of the invention.

The voltage signals $E_{t4}$ are characterized by the associated attenuation factor K, where the range of K extends between $K_1$ being equal to or greater than zero, and $K_2$ being equal to or less than one. To provide a transfluxor circuit initially responsive to either positive or negative control pulses $+E_c$ or $-E_c$ from the windings 16 or 17 (see FIGURE 1), the core 13 of the transfluxor 12 is initially medially magnetized between a fully blocked and a fully unblocked state. Where the alternating voltage signals $E_{t4}$ are utilized in a feedback loop as in a synchronizer as shown in FIGURE 1, there must be no feedback signals when the transfluxor is set by the medial magnetization. To obtain an alternating sine wave feedback voltage $E_f$ of this character and range where the attenuation factor K is within the previously stated limits, the alternating voltage $E_{t4}$ is applied to a summing means 24 which receives an alternating sine wave voltage $-\frac{1}{2}E_r$ that is representative of one-half of the reference voltage $E_r$ and is 180° out of phase with signals $E_{t4}$ as indicated. Thus the range of the alternating feedback voltage $E_f$ is contemplated as being from $-\frac{1}{2}E_r$ to $+\frac{1}{2}E_r$ and is vectorially illustrated in FIGURE 4. For correct operation of the synchronizer, illustrated in FIGURE 1, the range of the alternating feedback voltage $E_f$ must be at least equal to or greater than the range of the synchronizer input voltage $E_1$ so that when these two voltages are algebraically summed the feedback voltage $E_f$ balances input voltage $E_1$ at any value and the synchronizer output voltage $E_0$ is reduced to zero. Briefly, this is accomplished by applying the feedback voltage $E_f$ and the synchronizer input voltage $E_1$ to a summing means 25. The summing means 25 provides synchronizer output signals $E_0$ and differential voltage signals $E_2$ which are applied to a network 26. The network 26 produces control pulses $+E_c$ or $-E_c$ in response to the signals $E_2$ to vary the magnetization or the attenuation factor K of the transfluxor 12. Network 26 may include a six diode gate of the kind described in Pulse and Digital Circuits, by Millman and Taub, published by McGraw-Hill Book Company, Inc., at page 445. This causes the feedback voltage $E_f$ to change accordingly to reduce the synchronizer output signals $E_0$ to zero.

The transfluxor signal pulse input network of FIGURE 1 may be modified as shown in FIGURE 5 to initially provide currents which are a function of the voltages. In this modified input circuit, a pulse generator 110 alternately provides driving pulses $I_{p1}$ and the priming pulses $I_{p2}$ which are current pulses of constant amplitude and opposite polarity. The driving pulses $I_{p1}$ are applied a modulator 111 which receives constant amplitude, alternating sine wave reference current $I_r$. The alternating current $I_r$ modulates the pulses $I_{p1}$ to produce the modulated current pulses $I_{p3}$. As in the circuit of FIGURE 1, the modulated current driving pulses $I_{p3}$ and the current priming pulses $I_{p2}$ are alternately applied to the core 13 of the transfluxor 12 by the primary or energizing windings 18 and 19, respectively. Although not shown, the second primary or energizing winding 19 of the transfluxor 12 of FIGURES 1 and 5 may be eliminated. In both input circuits, the primary or energizing winding 18 would then alternately apply the modulated current driving pulses $I_{p3}$ and the current priming pulses $I_{p2}$ to the core 13 of the transfluxor 12.

Although but two embodiments of the invention have been illustrated and described in detail, it is to be expressly understood that the invention is not limited thereto. Various changes may also be made in the design and arrangement of the parts without departing from the spirit and scope of the invention as the same will now be understood by those skilled in the art.

I claim:

1. A transfluxor operating circuit comprising a transfluxor having control, energizing and output windings, driving means connected to the energizing winding providing alternate sine wave modulated drive pulses and priming pulses of opposite polarity for energizing the transfluxor to produce modulated pulse signals at its output winding, means connected to the control winding providing signals to control the level of energization of the transfluxor, and means connected to the output winding to convert the pulse signals to alternating sine wave voltage.

2. A transfluxor operating circuit comprising a transfluxor having control, energizing and output windings, driving means connected to the energizing winding providing alternate sine wave modulated current drive pulses and constant amplitude priming pulses for creating alternating flux in the transfluxor to produce modulated pulse signals at its output winding, means connected to the control winding for providing signals to control the level of the flux, and means connected to the output winding to convert the pulse signals to alternating sine wave voltage.

3. A transfluxor operating circuit according to claim 2 in which the means connected to the output winding of the transfluxor includes means to recover the maximum modulation amplitude of the modulated pulse signals, means connected to the amplitude recovery means for peak sampling the pulse signals, and means connected to the sampling means for producing the alternating sine wave voltage from the pulse samples.

4. A transfluxor operating circuit comprising a transfluxor having control, energizing and output windings, a generator providing alternate current driving pulses and current priming pulses of opposite polarity, means connected to the generator and connected to an alternating sine wave voltage source for amplitude modulating the driving pulses, the generator and the modulating means being connected to the energizing winding for energizing the transfluxor to produce modulated pulse signals at its output winding, means connected to the control winding for providing signals to control the amount of energization of the transfluxor, and means connected to the output winding of the transfluxor for converting the modulated pulse signals to alternating sine wave voltage.

5. A transfluxor operating circuit according to claim 4 in which the means connected to the output winding of the transfluxors includes restoring means to recover the maximum modulation amplitude of the modulated pulse signals, a detector connected to the restoring means for peak sampling the modulated signal pulses when the maximum modulation amplitude is recovered, and a filter connected to the detector for producing the alternating sine wave voltage from the pulse samples.

6. A transfluxor operating circuit according to claim 5 having means connected to the filter and to an alternating sine wave voltage source providing a voltage of one-half of the value of the modulating voltage and being opposite in phase to the alternating voltage from the filter.

7. A transfluxor operating circuit comprising a transfluxor having control, energizing and output windings, a generator providing alternate voltage driving pulses and voltage priming pulses of opposite polarity, means connected to the generator and to a source of alternating sine wave reference voltage for amplitude modulating the driving pulses, resistance means connected to the modulating means and the generator to receive the modulated voltage driving pulses and the voltage priming pulses to provide alternate modulated current driving pulses and current priming pulses, the resistance means being connected to the energizing winding for energizing the transfluxor to produce modulated voltage pulse signals at its output winding, means connected to the control winding for providing signals to control the level of energization of the transfluxor, and means connected to the output winding of the transfluxor to convert the modulated voltage pulse signals to alternating sine wave voltage.

8. A transfluxor operating circuit according to claim 7 in which the means connected to the output winding of the transfluxor includes restoring means to recover the maximum modulation amplitude of the modulated pulse signals, a detector connected to the restoring means for peak sampling the modulating signal pulses when the maximum modulation amplitude is recovered, and a filter connected to the detector for producing alternating sine wave voltage from the pulse samples.

9. A transfluxor operating circuit according to claim 8 having means connected to the filter and to an alternating sine wave voltage source of one-half the amplitude of and of opposite phase to the alternating sine wave reference voltage.

References Cited in the file of this patent

UNITED STATES PATENTS 2,980,892 Crane ------------------- Apr. 18, 1961